(12) United States Patent
Gill et al.

(10) Patent No.: US 8,185,754 B2
(45) Date of Patent: May 22, 2012

(54) TIME-BASED STORAGE ACCESS AND METHOD OF POWER SAVINGS AND IMPROVED UTILIZATION THEREOF

(75) Inventors: Binny S. Gill, Shrewsbury, MA (US); Madhukar R. Korupolu, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 559 days.

(21) Appl. No.: 12/393,002

(22) Filed: Feb. 25, 2009

(65) Prior Publication Data

US 2010/0218013 A1 Aug. 26, 2010

(51) Int. Cl.
*G06F 1/26* (2006.01)
(52) U.S. Cl. ........ 713/300; 713/320; 365/226; 365/227; 365/229
(58) Field of Classification Search .................. 713/300, 713/320
See application file for complete search history.

(56) References Cited

U.S. PATENT DOCUMENTS

| | | | |
|---|---|---|---|
| 7,010,493 B2 | 3/2006 | Yamamoto et al. | |
| 7,035,972 B2 | 4/2006 | Guha et al. | |
| 7,152,142 B1 | 12/2006 | Guha et al. | |
| 7,210,004 B2 | 4/2007 | Guha et al. | |
| 7,210,005 B2 | 4/2007 | Guha et al. | |
| 7,330,931 B2 | 2/2008 | Guha et al. | |
| 7,426,646 B2 * | 9/2008 | Fujimoto | 713/300 |
| 2002/0199129 A1 * | 12/2002 | Bohrer et al. | 714/7 |
| 2005/0228949 A1 * | 10/2005 | Yamamoto et al. | 711/114 |
| 2005/0273638 A1 * | 12/2005 | Kaiju et al. | 713/323 |

OTHER PUBLICATIONS

Luo, Yan et al., "Low Power Network Processor Design Using Clock Gating," Proceedings of the 42nd annual conference on Design Automation, Jun. 2005, p. 712-715.
Benini, L., "Advanced Power Management Techniques: Going Beyond Intelligent Shutdown," Proceedings of the 2003 Conf. on Asia S. Pacific Design Automation, Jan. 2003, p. 385-389.
Colarelli, D. et al., "The Case for Massive Arrays of Idle Disks (MAID)," In the 2002 Conference on File and Storage Technologies, Jan. 7, 2002, p. 1-6.
Zhu, Q. et al., "Hibernator: Helping Disk Arrays Sleep Through the Winter," SOSP'05 : ACM Symposium on Operating Systems Principles No. 20, Oct. 23, 2005, p. 177-190.
Gurumurthi, S. et al., "Reducing Disk Power Consumption in Servers with DRPM," IEEE Computer Society, Dec. 2003, pp. 41-48.
Pinheiro, E. et al., "Energy Conservation Techniques for Disk Array-Based Servers," Proceedings of the 18th annual international conference on Supercomputing, Jun. 2004, pp. 68-78.
Fujitsu, MAP 10K RPM, pp. 1-3, http://www.fujitsu.com/us/services/computing/storage/hdd/discontinued/map-10k-rpm. html.

* cited by examiner

*Primary Examiner* — Nitin Patel
(74) *Attorney, Agent, or Firm* — Kenneth L. Sherman, Esq.; Michael Zarrabian, Esq.; Sherman & Zarrabian LLP

(57) ABSTRACT

The invention provides a method and system for time-based storage access, the method includes associating a plurality of storage volumes with specific periods of time during which they can be accessed, adjusting user fees based on access time periods of storage volumes, packing the plurality of storage volumes in available storage bins in the system based on periods of access for the plurality of storage volumes, wherein volumes with overlapping or similar periods of access are packed into a same storage bin if possible, and switching a storage bin to off or a reduced power state during periods when the storage volumes placed in the storage bin are not required, to reduce power consumption.

19 Claims, 3 Drawing Sheets

TIME-BASED STORAGE ACCESS AND METHOD OF POWER SAVINGS AND IMPROVED UTILIZATION THEREOF

BACKGROUND OF THE INVENTION

1. Field of the Invention

The present invention relates generally to data object storage, and in particular, to reducing power consumption and improving utilization through time-based storage access.

2. Background Information

Storage power consumption is a growing concern in data centers. Some studies show that over 27% of energy consumed in data centers to be by storage devices. The predicted storage capacity growth of 50% year over year for the next few years, while the increase in storage density of hard disks is expected to slow down, will further exacerbate this problem as enterprises continually add additional storage devices to meet the growing capacity requirements.

Furthermore storage infrastructures are typically provisioned for peak usage leading to under utilization.

Efforts for power management in storage are primarily based on turning off disks and controllers during periods of inactivity or on lowering disk speeds adaptively when workload requirements do not necessitate the disk being at full speed. A good example in the former case is the MAID (Massive Array of Idle Disks) architecture wherein a disk cache is used in front of a large array of disks to increase the idle inactivity time for the disks so they can be turned off for power savings. The cache serves the read and write requests from the clients, powering the background disks ON only when necessary. The writes are held in the cache and written back in a batched manner when the disk comes on. However, a downside of these approaches is that even if one workload volume on a disk is active then the disk has to be kept ON and thus incur power consumption.

SUMMARY OF THE INVENTION

The invention provides time-based storage access, the method includes associating a plurality of storage volumes with specific periods of time during which they can be accessed, adjusting user fees based on access time periods of storage volumes, packing the plurality of storage volumes in available storage bins in the system based on periods of access for the plurality of storage volumes, wherein volumes with overlapping or similar periods of access are packed into a same storage bin if possible, and switching a storage bin to off or a reduced power state during periods when the storage volumes placed in the storage bin are not required, to reduce power consumption.

Another embodiment involves a system for controlling power consumption of a data storage system, comprising: an associating module for associating access time periods with a plurality of storage volumes, a placement module to place the plurality of storage volumes into assigned storage bins in the data storage system based on aggregate access time periods for the plurality of storage volumes, and a storage controller module for controlling the power state of the plurality of storage volumes, wherein a first plurality of storage volumes placed in a first storage bin are each placed in the same reduced or off power state to reduce power consumption.

Yet another embodiment involves a computer program product for controlling power consumption of a data storage system that causes a computer to associate access time periods with a plurality of storage volumes, and place the plurality of storage volumes in assigned storage bins in the data storage system based on aggregate access time periods for the plurality of storage volumes. The plurality of storage volumes placed into the assigned storage bins are placed in the same reduced power or off power state to reduce power consumption.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DESCRIPTION OF THE PREFERRED EMBODIMENTS

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The description may disclose several preferred embodiments for reducing power consumption based on access time, as well as operation and/or component parts thereof. While the following description will be described in terms of deduplication reduction processes and devices for clarity and to place the invention in context, it should be kept in mind that the teachings herein may have broad application to all types of systems, devices and applications.

The invention provides a method and system for time-based storage access, the method includes associating a plurality of storage volumes with specific periods of time during which they can be accessed, adjusting user fees based on access time periods of storage volumes, packing the plurality of storage volumes in available storage bins in the system based on periods of access for the plurality of storage volumes, wherein volumes with overlapping or similar periods of access are packed into a same storage bin if possible, and switching a storage bin to off or a reduced power state during periods when the storage volumes placed in the storage bin are not required, to reduce power consumption.

Figure 1:
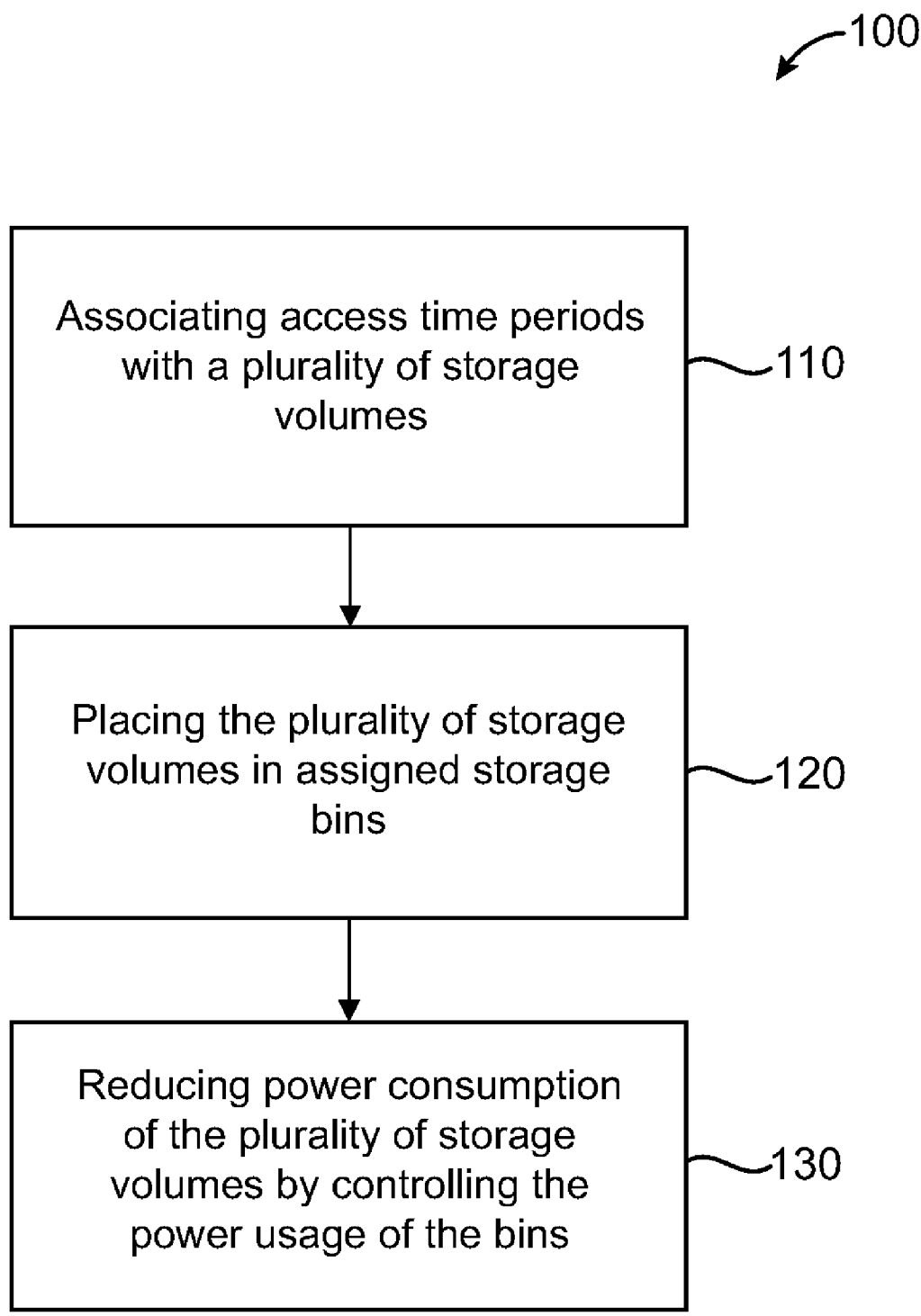
FIG. 1 illustrates a block diagram of a process 100 for reducing storage power consumption according to one embodiment of the invention.

FIG. 1 illustrates a block diagram of a process 100 for reducing storage power consumption according to one embodiment of the invention. In block 110, storage volumes in a data center system are associated with access time periods. In one embodiment of the invention, during off-peak hours (e.g., at night), when the data center system is under-utilized, storage providers can lower the cost of access to storage resources to allure customers that do not mind being restricted to off-peak hours. In this embodiment of the invention, a storage access during peak hours is associated with a higher cost. This allows the storage provider to use their resources better without imposing an increase in the peak traffic which is limited due to power and network bandwidth constraints. Further, in many cases, the cost of power in off-peak hours is less expensive than during the peak hours.

In one embodiment of the invention, the access time periods are determined based on storage access patterns. There are many examples of storage access patterns that are time-based, such as the following:

1. Backups/replications: Most happen at off-peak hours (nightly);
2. Data mining: Can be done whenever it is less expensive to do so;
3. Data consistency checking: e.g., Banks do can do this after close of business;
4. Small businesses: Data needed during open hours only;
5. Personal multimedia: photos, music, video: Could be cheaper during evening/weekends;
6. Banking data: Require daytime processing; (night time would be rare after books are closed);
7. Stock market/Financial firms: 9:30 am-4:00 pm;
8. Any backup data can occur during off-peak;
9. Any data where human interaction is present can deal with long start up times for access outside time window; and
10. Even within MAID-like architecture based on access of volumes, they will need volumes to be up for certain amounts of times, preferably soon after their peak activity period. This information can be fed into a Greedy Minimum Shadow (GMS) algorithm (see below) to figure out the most power-saving scheme for MAID internal power management.

In block 120, the storage volumes are placed in assigned storage bins in the data center system. In one embodiment of the invention, storage volumes with similar access times are grouped together and placed in a storage bin. A storage volume is a logical entity of a given size used to store data for applications. The physical location of this entity is not specified by the application. A storage bin is a storage device of a given size that can hold one or more storage volumes and that can be powered ON and OFF independent of other storage bins. The access period of a volume is a period of time (typically repeating at a specified interval), during which active I/O is expected and the volume is required to be kept ON. A repeat interval is a length of time, which is the lowest common multiple of the individual access periods specified in a system.

As used herein, "shadow" is a metric that measures the aggregate time for which an entity has to be kept ON to serve Ms during a repeat interval. For example, a storage volume with an access period of length L will have a shadow of L units; while a bin holding two volumes of access periods [20-60] units and [40-80] units respectively will have a shadow of 60 units.

A shadow of a volume is the aggregate of the access periods of the volume. A shadow of a storage bin is the aggregate of the time periods during which the bin has to be kept ON, i.e., aggregate of the time periods where at least one of the volumes packed/placed in the bin has to be ON. Therefore, the shadow of a storage bin is used to measure the power consumed by the storage bin.

The shadow of a set of volumes S is defined to be the shadow when all these volumes are packed/placed into a single (large enough) storage bin. In one embodiment of the invention, this measure is primarily employed for comparison purposes since such a packing/placing may not always be practical. In one embodiment of the invention, if no access time periods are specified for a storage volume, the default is that that the volume is required at all times.

One example of placing the storage volumes in a storage bin is as follows. Consider four storage volumes $I_1, I_2, I_3, I_4$ where $I_1$ is accessed for a time period [0-40], $I_2$ for [20-60], $I_3$ for [40-80] and $I_4$ for [60-100] and two bins are each capable of holding two storage volumes. In this example, it is ideal to pack $I_1, I_2$ in one storage bin and $I_3, I_4$ in the other leading to an aggregate ON time of 120 time units. Any other packing/placing would incur a higher ON time, which consumes more power. Therefore, power can be saved by placing storage volumes so as to minimize the total shadow of the configuration.

In block 130, power consumption in the data center system is reduced by turning off or placing storage volumes in a same bin in a reduced power state during periods where access is not required or reduced. In one embodiment of the invention, portions of the infrastructure may not be needed during certain times of the day. There can be some cost associated with power-cycling any component. Therefore, in one embodiment of the invention, the cost of power cycling with the benefit of power saved is compared, before deciding to power cycle a component (i.e., storage volumes, storage bins).

In one embodiment of the invention, the benefit of powering down components will outweigh the power cycling costs if the number of power cycles is limited to a small number per day. For example, storage disks may have a 20,000 power cycle rating. This affords 10 power cycles per day (assuming a 5 year life). Assuming a low rate of power cycles (one or two per day), no significant cost in terms of lost reliability of the disks is incurred. Other than this aspect, more power is consumed during power up of storage disks than normal. This implies that if the time difference between a power down and subsequent power up of a disk is too small (e.g., a minute or more), then the disk is kept powered on according to one embodiment of the invention. In another embodiment of the invention, similar comparisons may be required for other components of the data center system that require being powered down. In some cases a power cycle may in fact help reliability (especially software issues), and these are also considered in other embodiments of the invention.

Finally, the other important aspect is the minimum time required for a power cycle. The gap between a power down and a power up cannot be less than this amount. In the context of storage services, we are more concerned with the power cycle time for infrastructure hardware rather than software that is based on it. The reason is, applications that use time-based storage services such as the ones above will be able to handle unavailable storage and act accordingly. As time-based access becomes common, more investment will be made towards lowering the power cycle time of all components.

The Greedy Minimum Shadow (GMS)

In one embodiment of the invention, the knowledge of the access periods entered via an extended administrator interface is leveraged to conserve power in the data center system. In one embodiment, it is assumed that the storage bins consume the same power when turned ON irrespective of the number of storage volumes concurrently active and the level of activity on the storage volumes.

In one embodiment of the invention, for simplicity of exposition, it is assumed that the power consumption of the storage bins are identical when turned ON (the power consumption in the OFF state is assumed to be zero). In one embodiment of the invention, whenever this is not the case, the shadow of a given set of storage volumes is computed as a weighted aggregate of the shadow of the individual storage volume bins.

In one embodiment, it is assumed a sufficiently large number of bins are available. Given: A set of storage bins: $B_1$, $B_2, \ldots, B_n$ of sizes $|B_1|, |B_2|, \ldots, |B_n|$ and a set of storage volumes: $V_1, V_2, \ldots, V_n$ of sizes $|V_1|, |V_2|, \ldots, |V_n|$. Goal: Pack/place these storage volumes into the storage bins so as to minimize the aggregate shadow. Without loss of generality it is assumed that the bins are sorted in decreasing order of size, $B_1$ being the largest.

In one embodiment of the invention, all storage bins are initially empty. Let vols(B) return the set of storage volumes present in storage bin B. Let shadow(A) return the shadow of all storage volumes in the set A when assigned to a large enough bin. In one embodiment of the invention, the source bin $B_{src}$ refers to $B_1$, the destination bin $B_{dest}$ refers to $B_2$, and the storage volumes initially remain to be placed, $A=V_1, V_2, \ldots, V_n$.

Next, all storage volumes belonging to A are logically placed into $B_{src}$. Then, we use the following process below written in pseudo code form:

$$\text{if} \left( \left( \sum_{V_i \in B_{src}} |V_i| \right) \leq |B_{src}| \right) \text{then} \quad \text{Eq. 1}$$

Let $A = A - \text{vols}(B_{src})$
Let $B_{src}$ refer to $B_{dest}$
Let $B_{dest}$ refer to the next empty bin
Endif
If $A == \phi$ END $$\text{If} \left( \left( \sum_{V_i \in B_{src}} |V_i| \right) > |B_{src}| \right) \text{then} \quad \text{Eq. 2}$$

Find $V_{min} \in B_{src}$ such that for all $V_i \in B_{src}$
  shadow(vols($B_{src}$) − $V_{min}$) + shadow(vols($B_{dest}$) + $V_{min}$) ≤
  shadow(vols($B_{src}$) − $V_i$) + shadow(vols($B_{dest}$) + $V_i$)
Move $V_{min}$ from $B_{src}$ to $B_{dest}$. Next return to Eq. 1 and repeat.

Figure 2:
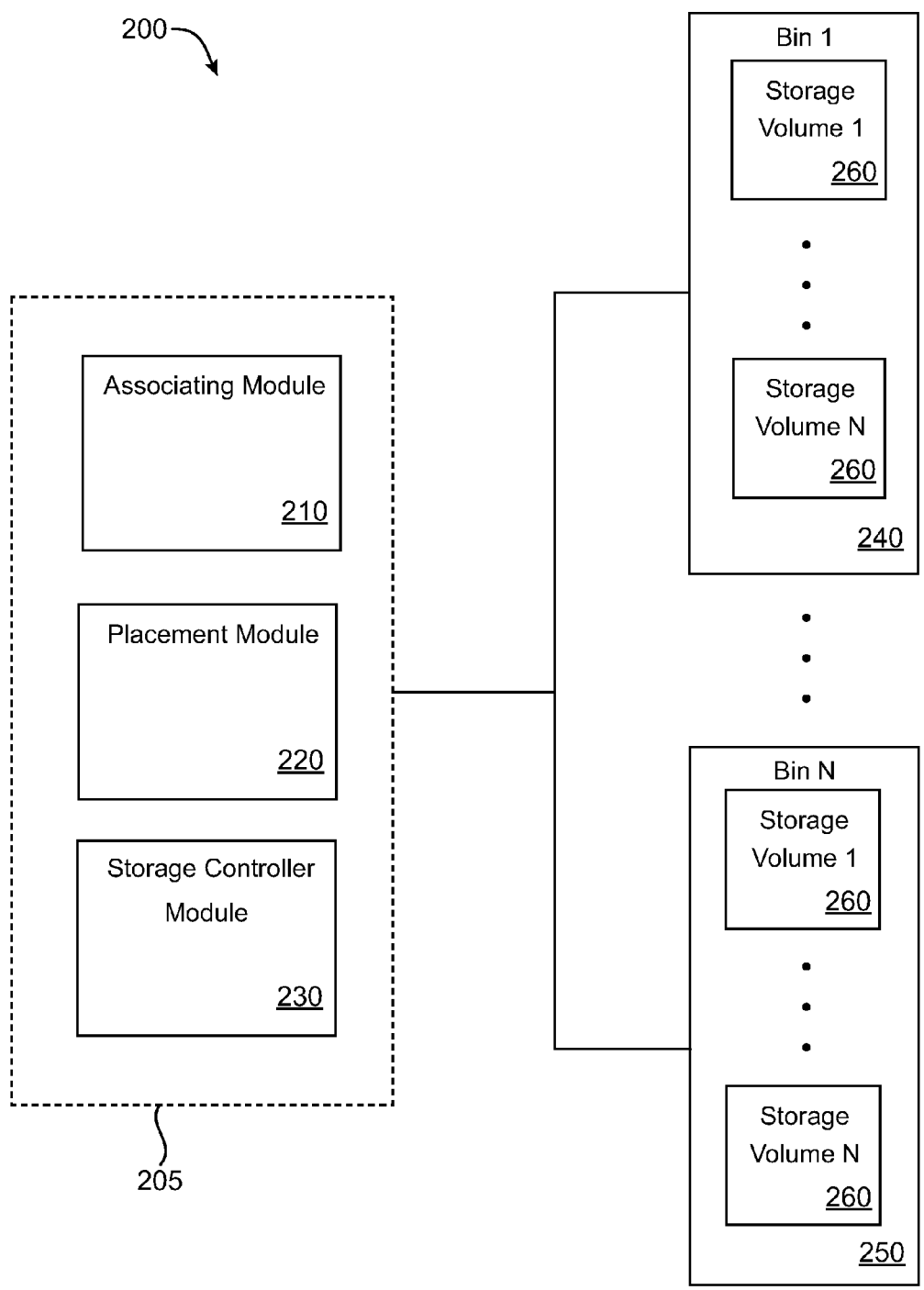
FIG. 2 illustrates a storage power reduction device according to an embodiment of the invention.

FIG. 2 illustrates the overall architecture of a storage power reduction system according to one embodiment of the invention. In this embodiment of the invention, system 200 includes associating module 210, placement module 220 and storage controller module 230. In one embodiment, the associating module 210, the placement module 220 and the storage controller module 230 are coupled together in a single power reduction module 205. In other embodiments, the associating module 210, the placement module 220 and the storage controller module 230 are separate components in system 200.

System 200 further includes storage bin 1 240 to storage bin N 250. Each storage bin has one or more storage volumes 260 placed in the storage bin according to process 100 and other embodiments of the invention.

Figure 3:
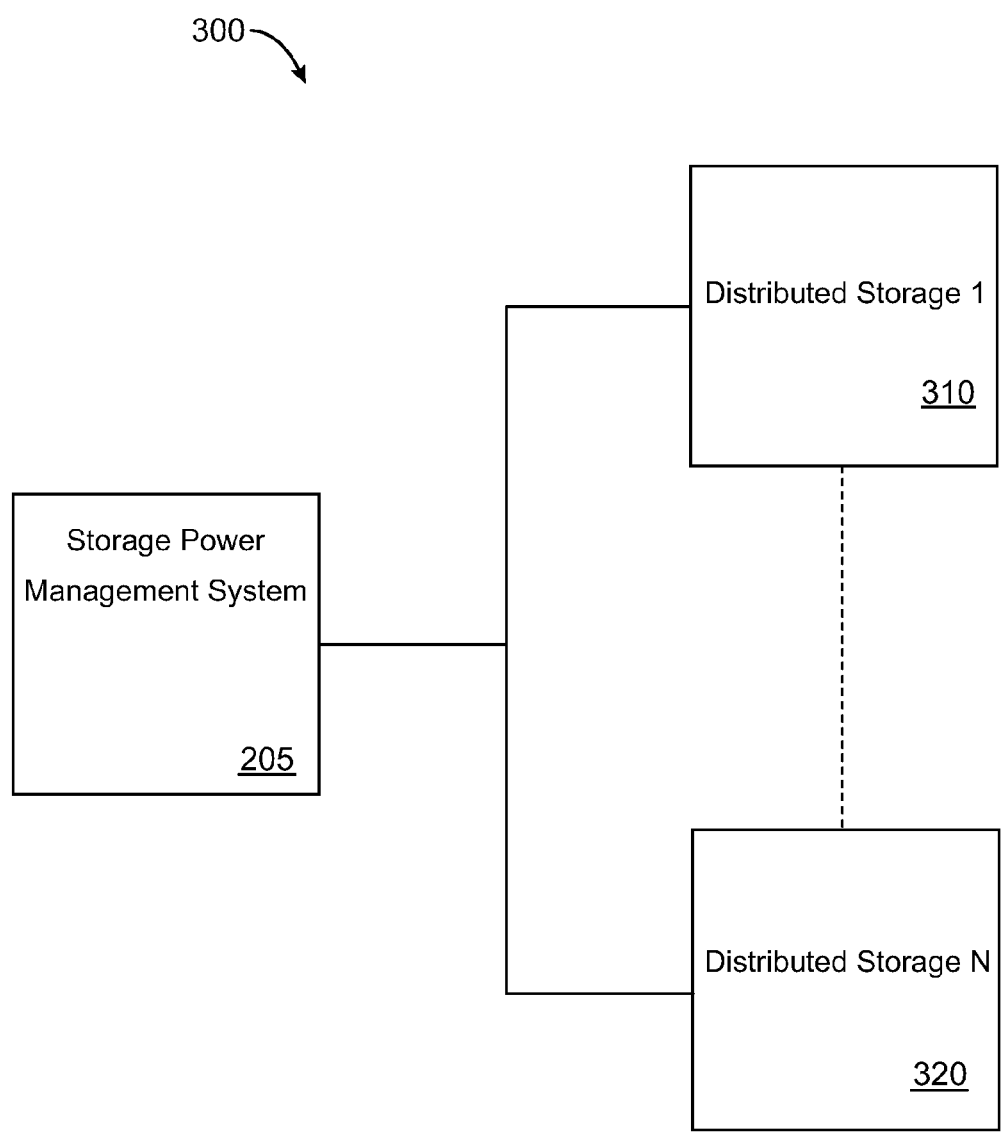
FIG. 3 illustrates a distributed storage power reduction system according to an embodiment of the invention.

FIG. 3 illustrates a distributed storage power reduction system according to an embodiment of the invention. In one embodiment of the invention, the system 300 is a distributed network including a plurality of storage device systems. As illustrated, system 300 includes distributed storage system 1 310 to distributed storage system N 320. In this embodiment of the invention the power reduction module 205 is further configured to perform the process 100 on each storage system resulting in a power consumption reduction throughout system 300.

In the embodiments of the invention, the utilization and cost of operation of storage service infrastructures are reduced by leveraging the concept of the time-based storage service model. Using different billing rates for different times allows storage service providers a mechanism to improve infrastructure utilization while being able to capture a segment of the market that remains untapped. The users will be able to specify the time periods during which they require access to their storage volumes. Based on the time and duration, a specific billing rate is decided. This information about the access periods is leveraged to reduce the power consumption within the data center. According to one embodiment of the invention, the approach is to group together storage volumes with similar access times on the same hardware. When the storage hardware is not required to be active based on the access periods of the constituent storage volumes, it can be turned off to save power. Furthermore, the method presented here is orthogonal to the MAID approach and can be used concurrently with MAID to enhance the effectiveness of MAID systems by careful placing of storage volumes.

The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer, processing device, or any instruction execution system. For the purposes of this description, a computer-usable or computer readable medium can be any apparatus that can contain, store, communicate, or transport the program for use by or in connection with the instruction execution system, apparatus, or device.

The medium can be electronic, magnetic, optical, or a semiconductor system (or apparatus or device). Examples of a computer-readable medium include, but are not limited to, a semiconductor or solid state memory, magnetic tape, a removable computer diskette, a RAM, a read-only memory (ROM), a rigid magnetic disk, an optical disk, etc. Current examples of optical disks include compact disk-read only memory (CD-ROM), compact disk-read/write (CD-R/W) and DVD.

I/O devices (including but not limited to keyboards, displays, pointing devices, etc.) can be connected to the system either directly or through intervening controllers. Network adapters may also be connected to the system to enable the data processing system to become connected to other data processing systems or remote printers or storage devices through intervening private or public networks. Modems, cable modem and Ethernet cards are just a few of the currently available types of network adapters.

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method of time-based storage access, the method comprising:
    associating a plurality of storage volumes with specific periods of time during which they can be accessed;
    adjusting user fees based on access time periods of storage volumes;
    packing the plurality of storage volumes in available storage bins in the system based on periods of access for the plurality of storage volumes, wherein volumes with similar access time periods are packed into a same storage bin;
    switching a storage bin to off or a reduced power state during periods when the storage volumes placed in the storage bin are not required, wherein power consumption is reduced, and
    powering off and entering a power saving state for a storage bin between two access time periods is performed upon determining that a cost of cycling power on the storage bin is less than a cost of power saved in the power saving state.

2. The method of claim 1, further comprising:
    associating access time periods with varying pricing, wherein preferred access time periods are associated with a higher price; and
    charging users based on when they access their storage.

3. The method of claim 1, further comprising:
    determining the access time periods based on storage access patterns.

4. The method of claim 2, further comprising:
    reducing peak resource requirements by using lower prices to attract users from access time periods of high utilization to access time periods of low utilization; and
    improving system utilization by using lower prices to attract new users to use access time periods of low utilization.

5. The method of claim 1, further comprising:
    determining the access time periods based on user input.

6. The method of claim 1, wherein the packing of storage volumes with storage bins further comprises:
    tracking the total amount of time storage bins have to be kept active, wherein a storage bin is required to be kept active during time periods when any of the storage volumes placed in it are required for access; and
    reducing this total amount of time that the storage bins are active to reduce power consumption.

7. The method of claim 1, wherein the packed storage volumes are relocated to another storage bin upon determining a change in an associated access period for a storage volume increases power consumption.

8. The method of claim 1, wherein
    the switching a storage bin to off or a reduced power state is performed during a period of time based on determining that none of the plurality of storage volumes placed in it are required for access during that time.

9. The method of claim 1, wherein volumes with overlapping access time periods-are packed into a same storage bin.

10. A system for controlling power consumption of a data storage system, comprising:
    an associating module for associating access time periods with a plurality of storage volumes;
    a placement module to place the plurality of storage volumes into assigned storage bins in the data storage system based on aggregate access time periods for the plurality of storage volumes; and
    a storage controller module for controlling the power state of the plurality of storage volumes, wherein a first plurality of storage volumes placed in a first storage bin are each placed in the same reduced or off power state to reduce power consumption, wherein the storage controller module powers off and enters a power saving state for a storage bin between two access time periods upon determining that a cost of cycling power on the storage bin is less than a cost of power saved in the power saving state.

11. The system of claim 10, wherein the associating module determines the access time periods by analyzing storage access patterns.

12. The system of claim 10, wherein the associating module associates access time periods with varying pricing, wherein preferred access time periods are associated with a higher price.

13. The system of claim 10, wherein the placement module relocates a placed storage volume to another storage bin upon determining a change in an associated access period for the storage volume increased power consumption.

14. The system of claim 10, further comprising:
    a distributed network including a plurality of storage device sub-systems,
    wherein the storage controller module controls power states for a plurality of storage bins in each storage device sub-system.

15. A computer program product for controlling power consumption of a data storage system comprising a non-transitory computer usable medium including a computer readable program, wherein the computer readable program when executed on a computer causes the computer to:
    associate access time periods with a plurality of storage volumes;
    place the plurality of storage volumes in assigned storage bins in the data storage system based on aggregate access time periods for the plurality of storage volumes, wherein the plurality of storage volumes placed into the assigned storage bins are placed in the same reduced power or off power state to reduce power consumption; and
    perform powering off and entering a power saving state for a storage bin between two access time periods upon determining that a cost of cycling power on the storage bin is less than a cost of power saved in the power saving state.

16. The computer program product of claim 15, further causing the computer to place storage volumes having similar associated access time periods together in assigned storage bins.

17. The computer program product of claim 15, further causing the computer to:

determine the access time periods based on storage access patterns.

18. The computer program product of claim 15, further causing the computer to:

associate access time periods with varying pricing, wherein preferred access time periods are associated with a higher price.

19. The computer program product of claim 15, wherein the placed storage volumes are relocated to another storage bin upon a change in an associated access period for a storage volume determined to increase power consumption.

* * * * *